United States Patent [19]
Fry

[11] Patent Number: 5,469,783
[45] Date of Patent: Nov. 28, 1995

[54] COLLECTOR FOR EMPTY USED RECYCLABLE BEVERAGE CANS

[75] Inventor: Gene Fry, Austin, Tex.

[73] Assignee: Eugene L. Fry, San Antonio, Tex.

[21] Appl. No.: 206,513

[22] Filed: Mar. 4, 1994

[51] Int. Cl.[6] ........................................ B30B 9/32
[52] U.S. Cl. ........................ 100/49; 100/91; 100/99; 100/173; 100/176; 100/902
[58] Field of Search .................... 100/45, 49, 91, 100/99, 173, 176, 902

[56] References Cited

U.S. PATENT DOCUMENTS

| | | | |
|---|---|---|---|
| 3,926,792 | 12/1975 | Buford | 100/91 X |
| 4,257,511 | 3/1981 | Miller | 100/91 X |
| 4,480,737 | 11/1984 | Jamgochian et al. | 100/902 X |
| 4,505,370 | 3/1985 | Swenck | 100/902 X |
| 4,989,507 | 2/1991 | Rhoades et al. | 100/902 X |
| 5,239,920 | 8/1993 | Schuff et al. | 100/45 |

Primary Examiner—Stephen F. Gerrity
Attorney, Agent, or Firm—Gunn & Associates

[57] ABSTRACT

A large cylindrical enclosure shaped to look like a huge beverage can has a recessed area in its outer wall containing an operator's panel and an opening into the interior for inserting empty recyclable beverage cans. Inside the enclosure is a conveyor for receiving the inserted cans, a discriminator for distinguishing between ferrous and non-ferrous cans and a pneumatic transporter for carrying the cans to a mechanical crusher which compacts the cans individually and discharges them into a temporary storage area from which they are removed from time to time for recycling. The operator'panel includes a photoelectric sensor for initiating operation of the mechanisms in the interior of the structure and may also include various visual readouts as well as a dispenser for feeding out coins, printed credit slips and receipts. The machine also contains programmable electronic circuitry for providing information and controls necessary for operation of the equipment and for determining the amount of payout and other useful data and information.

21 Claims, 7 Drawing Sheets

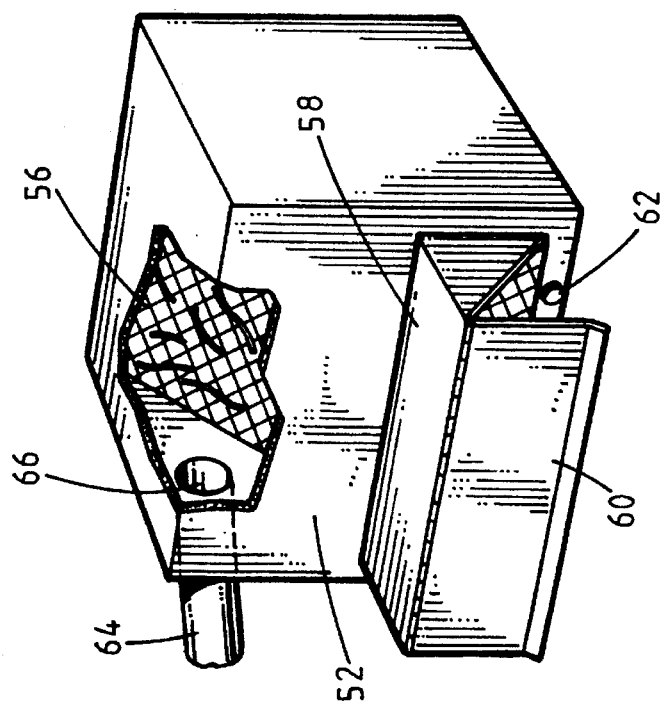
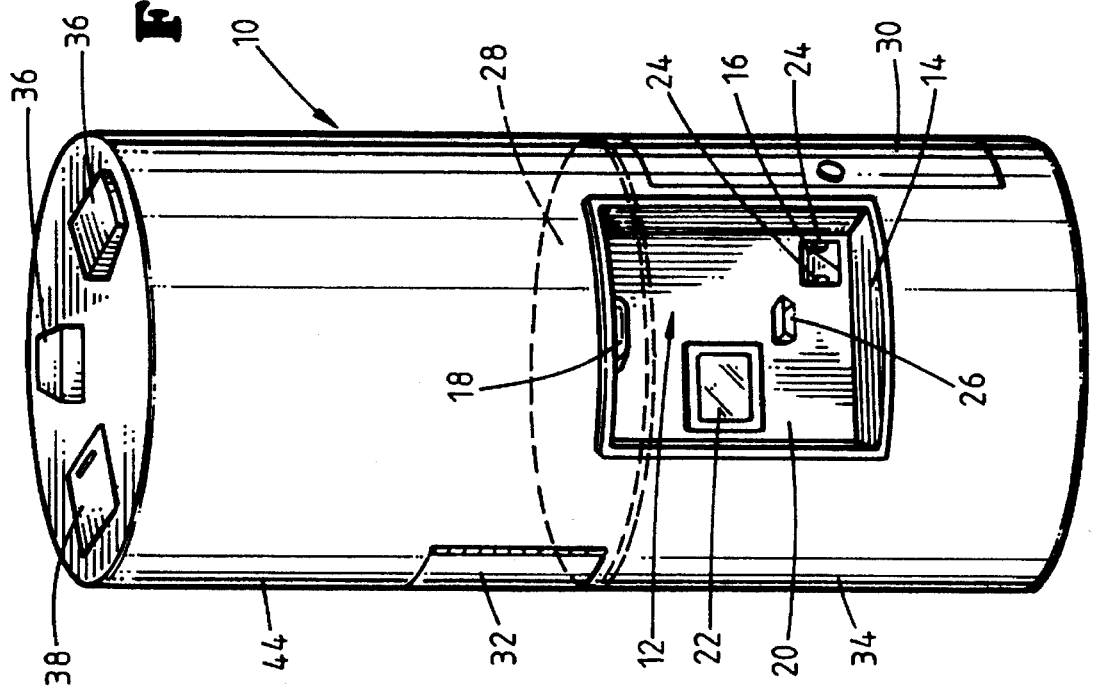

5,469,783

COLLECTOR FOR EMPTY USED RECYCLABLE BEVERAGE CANS

FIELD OF THE INVENTION

The present invention relates generally to the field of beverage can recycling machines and, more particularly, to an improved apparatus and method of recycling aluminum cans.

BACKGROUND OF THE INVENTION

The present invention is an improvement of the basic collector of Rhoades et al., U.S. Pat. No. 4,989,507, now owned by Cash Can, Inc., the assignee of the present invention, and incorporated herein by reference.

This invention provides a can collector for gathering and temporarily storing empty recyclable beverage cans that a consumer or householder may accumulate in relatively small numbers. The can collector machine can be conveniently located, for example in a grocery store parking lot, and the cans can be conveniently and easily deposited into the machine which compacts or crushes the cans and temporarily stores them within the enclosure from which they are eventually transported to a recycling station. The invention provides means for counting the deposited cans, means for determining if they are aluminum or non-aluminum, and may have means to compensate the depositor with cash or credit slips in payment for the deposited cans. In the latter case, the can collector becomes a reverse vending machine.

Rhoades et al. teach the basic structure of such a collector. The present invention, however, is directed to an enhanced system for the separation of aluminum cans from the other material deposited in the collector, a more robust crushing device, and a data collection, handling, and reporting feature that is neither shown nor suggested in known recycling collector systems.

In the past, known recycling machines have made certain efforts to separate ferrous from aluminum cans so that both could be recycled. Such machines also attempted to remove other unwanted debris, such as paper, glass, and other refuse from the cans to be recycled. Unfortunately, such efforts were less than effective and recyclable cans often became entrained in the refuse and trash was often carried along with cans to the crusher. This practice was wasteful and created frequent maintenance problems. Thus, there remains a need for an aluminum recycling machine that improves the separation process so that more aluminum cans are crushed for recycling and less debris is carried along with the aluminum.

Known systems have also suffered other maintenance problems. A frequent cause of recycling machine downtime was jamming of the crusher mechanism. While the removal of debris from the aluminum can stream significantly improves crusher reliability, there still remains a need for a more robust crusher mechanism. Such a crusher mechanism should provide for positive action in grasping, crushing, and ejecting cans from the crusher mechanism and remain free from malfunction in a mixed medium environment.

Finally, recycling mechanisms have heretofore functioned as isolated, stand-alone units with no communication contact with any other system. This has made accounting and accountability difficult and prohibitively expensive at best. Further, the only way to determine a breakdown or other problem with the recycling mechanism was on-site inspection. Little has been done, prior to the present invention, to adapt available microprocessor technology to the problem of monitoring and reporting in a recycling system.

SUMMARY OF THE INVENTION

The present invention addresses these and other problems of the prior art. A large vertically extending cylindrical enclosure, shaped to look like a huge beverage can has an intermediate floor dividing the interior into lower and upper compartments or chambers. This intermediate floor provides mechanical rigidity to the structure and may be omitted or replaced with other structural supports to accommodate other system layouts, fully within the spirit and teachings of the present invention.

An opening into the lower compartment permits cans to be deposited, preferably one at a time, and means are provided in the lower compartment to receive, count, and transport the cans to the upper compartment which contains an improved can crushing machine for crushing each of the cans and a storage area where the crushed cans are accumulated. The crusher mechanism includes a pair a rollers with radially extending teeth to positively accept, crush, and discharge aluminum cans for temporary storage.

The present invention also provides a means of improving the separation of desired aluminum cans from unwanted trash. The separation means develops a vacuum suction to withdraw lightweight trash and debris, an enhanced magnetic pulley/idler to remove ferrous materials, and a forced draft gravity separator to remove heavier trash from the aluminum.

The lower portion of the collector system of the present invention includes a conveyor for receiving the deposited cans. The conveyor has a magnet associated therewith for magnetically grasping magnetically permeable or ferrous cans for disposal. The conveyor also carries all of the deposited non-ferrous or aluminum cans to an air duct conduit opening. The present invention includes an improved system for separating aluminum from non-aluminum refuse using a baffled air-ducting segment. A coil wrapped around the air duct conduit provides an electrical signal for use in counting the number of cans passing through the air duct conduit. The air duct conduit uses high velocity air to transport the cans to a crushing machine in the upper chamber. The other side of the blower mechanism used to create the high velocity air is used very efficiently for creating a vacuum used to pick up paper, plastic, and light trash ("trash") from the conveyor and for transporting this trash to a separator mechanism for storage and subsequent disposal.

A new type of upper access is provided to the upper compartment for removal of the crushed cans from time to time for transportation to a recycling station. The outside of the structure has a panel area with operating instructions and video display for communications between the customer and the owner/operator of the recycling collector. The outside panel area also includes a chute to receive cans for recycling as well as photoelectric sensors for starting the operation of the machine.

The data collection and handling system of the present invention provides signals to visual indicators and control instructions to a dispenser for remitting coins and/or a printed credit slip for payment for the deposited cans and a printed receipt. The computer system that is an integral part of the collector of the present invention provides two-way communication for reporting from the collector to a central station as well as data and control communication from the central station to the collector.

Inside the structure is a micro-processor which can be programmed to power up the collector mechanism, to keep a record of the number of aluminum cans that are deposited, to trigger the payout mechanism which dispenses coins, and to control a printer for printing out a credit clip, coupon, or advertisements in payment for the deposited cans and a receipt. When used in this fashion, the machine functions as a reverse vending machine, i.e., making payment for cans deposited as distinguished from the normal vending machine which dispenses a canned beverage upon the receipt of deposited coins. The micro-processor can also be programmed to perform other record-keeping tasks, to interact with a location remote from the collector, and to energize and control a printer to print out data as desired.

These and other features of the present invention will be immediately apparent to those of skill in the art when they study the following detailed description in conjunction with the accompanying drawings.

BRIEF DESCRIPTION OF THE DRAWINGS

FIG. 1 is an elevation view of the exterior of a can collector constructed according to the teachings of this invention.

FIG. 4 is a partial breakaway perspective view illustrating the collection of lightweight trash for disposal.

DETAILED DESCRIPTION OF A PREFERRED EMBODIMENT

Figure 2:
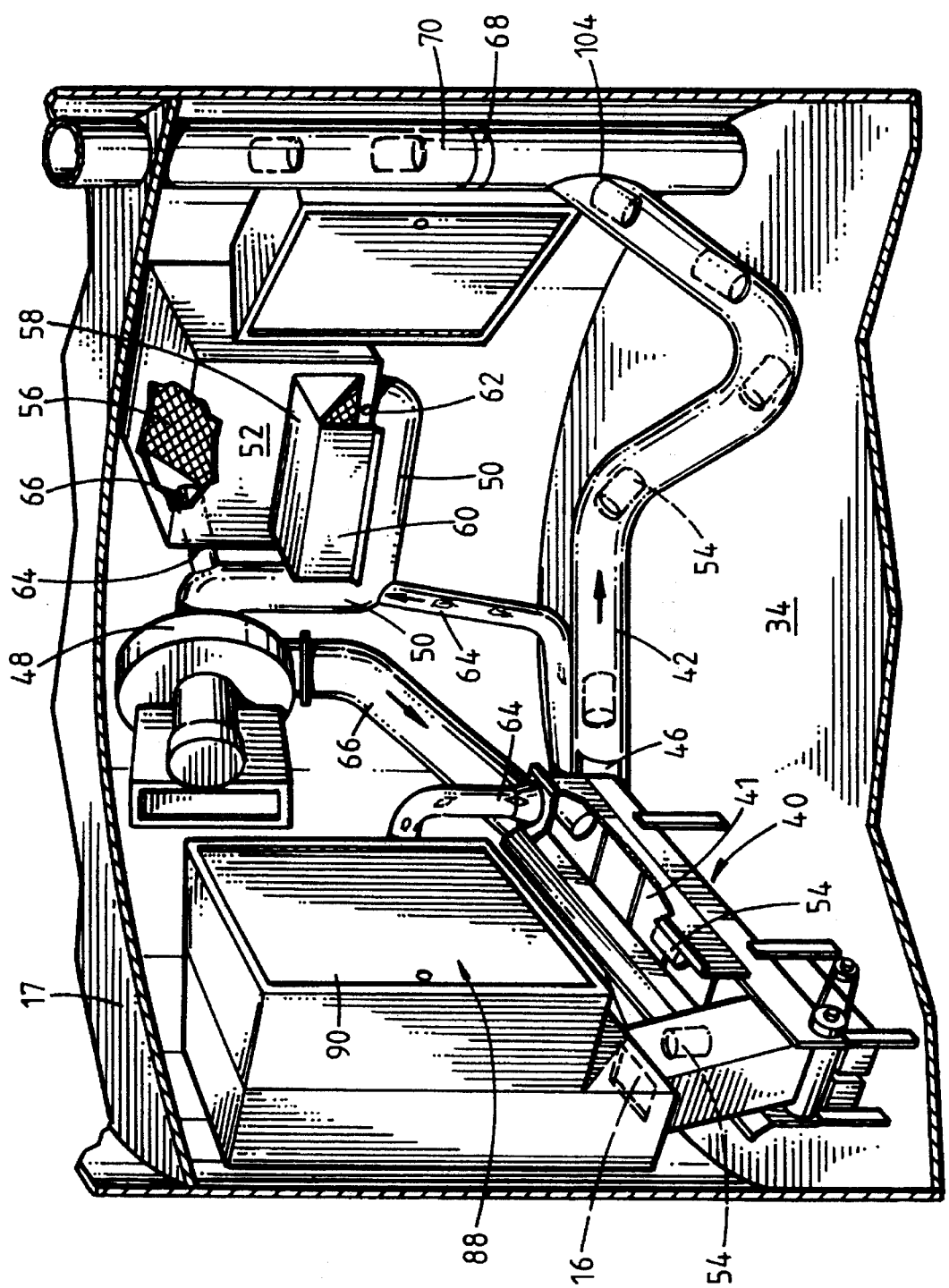
FIG. 2 is a view of the interior of the lower compartment of the collector.
Figure 3:
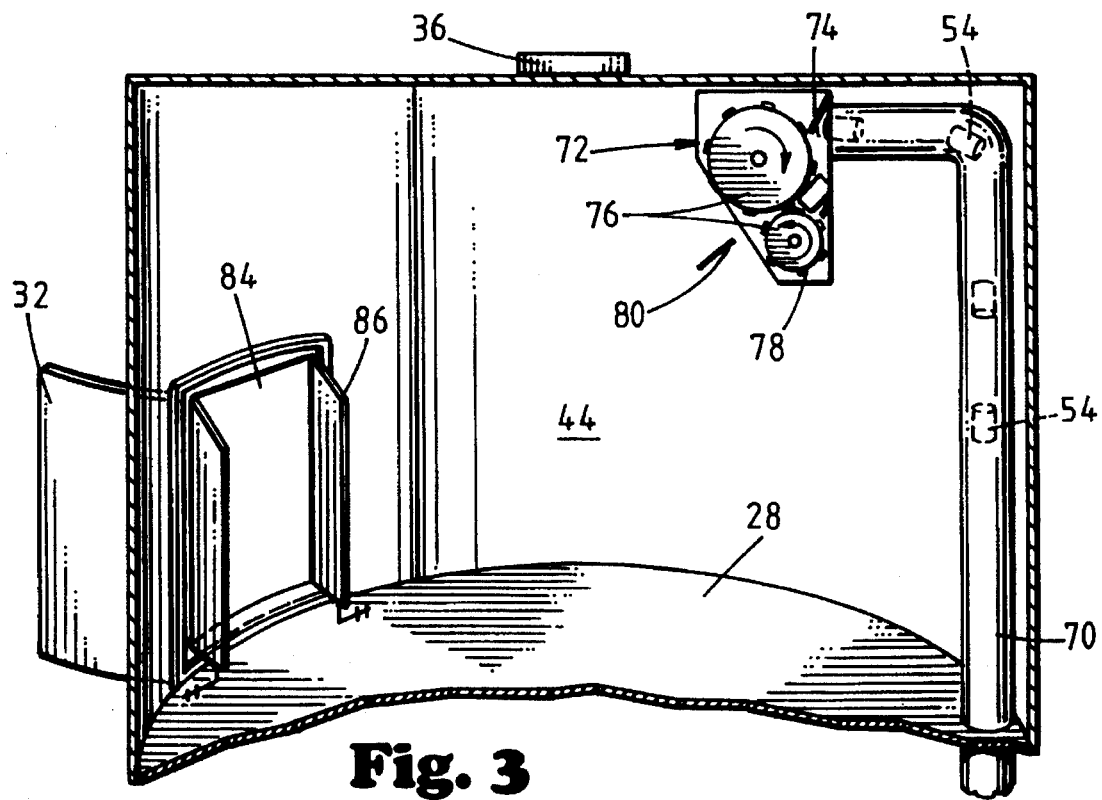
FIG. 3 is a view of the interior of the upper compartment.

The following detailed description will focus mainly on FIGS. 1–3 which illustrate the overall layout of a collector system of the present invention with frequent asides to FIGS. 4–9 to illustrate details of the system. The detailed description concludes with an explanation of FIGS. 10–11, which illustrate certain data handling, manipulation, and reporting features of the present invention.

FIG. 1 depicts a vertically disposed cylindrical enclosure 10 which is shaped to have the appearance of a huge beverage can. The enclosure 10 has a recessed area 12 in the outer wall with a horizontal platform 14 containing a chuted opening 16 into the interior of the enclosure through which beverage cans can be deposited. Preferably, the opening is just large enough to receive the cans only one at a time. The recessed area 12 may be provided with an overhead light 18 and a vertical panel 20 containing printed instructions and information as well as visual indicators and a video monitor 22 if desired.

Figure 8:
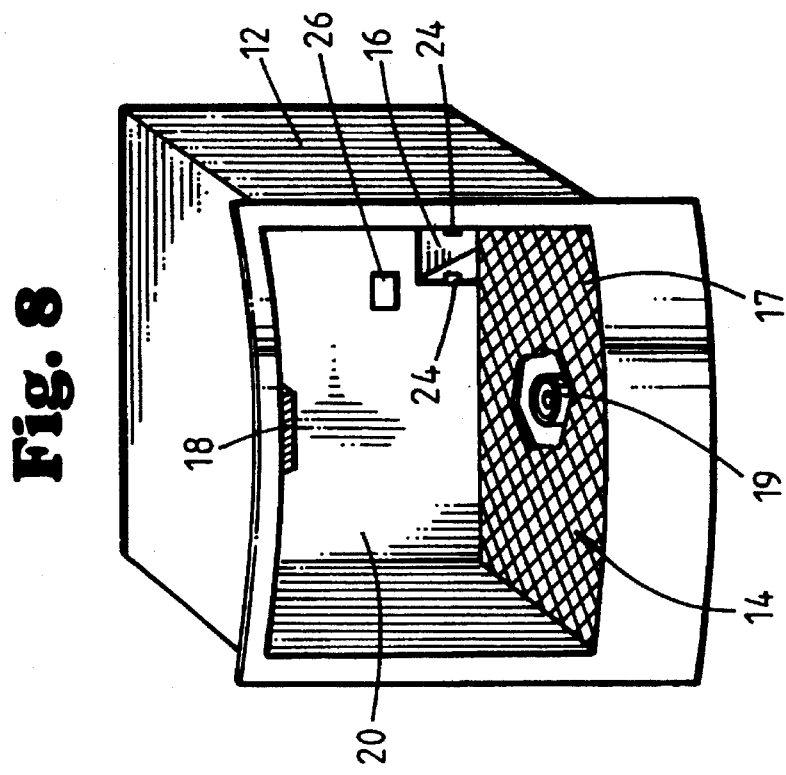
FIG. 8 is a detail view of a recessed panel area showing the component makeup of the panel.

FIG. 8 provides further details of the recessed area 12. The horizontal platform 14 includes a mesh bottom 17 so that any liquids may drain through the mesh bottom and through a drain 19 into the interior of the lower compartment 34.

Mounted on the chuted opening 16 are two photoelectric sensors 24 mounted on opposite sides of the chuted opening 16 to start the mechanisms within the enclosure, including a conveyor, a blower, and a crushing mechanism, described later in greater detail. Once the mechanisms have been started, they will continue through their cycle of operation and will automatically stop when completed. A dispenser 26 may also be provided for dispensing coins or a credit slip in payment for the deposited cans and a receipt containing a printout of the transaction.

As shown in FIG. 1, the interior of enclosure 10 may be separated into lower and upper compartments or chambers designated by reference numerals 34 and 44, respectively, by an intermediate raised floor 28. The intermediate raised floor 28 provides structural strength to the enclosure 10 and may be deleted by including other structural members so long as structure is provided to catch and temporarily store crushed cans, as described below. The intermediate raised floor 28, if included, is preferably substantially level to permit safe operations within the enclosure 10 during maintenance.

An access door 30 allows entry into the interior of the lower chamber 34 of enclosure 10 for maintenance and repair of the mechanisms located inside and an access door 32 to the interior of the upper chamber 44 is provided for removal of crushed cans that are temporarily stored in the collector. The top enclosure includes suitable conventional air vents 36. A flat hatch door 38 provides access for maintenance of the crushing mechanism, which is preferably located within the enclosure 10 near the door 38.

FIG. 2 provides greater detail of the lower chamber 34. Within lower chamber 34 of enclosure 10 located just below the recessed area 12 is a motor driven endless belt conveyor 40, which includes a moving belt surface 41. The chute 16 directs the cans 54 that are inserted through the opening 16 onto one end of the conveyor 40. The conveyor 40 carries the deposited cans toward the opposite end of conveyor 40 and dumps the cans by gravity and momentum from the conveyor to be deposited into a cutout opening 46 in a high velocity air duct conduit 42 just in front of the conveyor.

Figure 9:
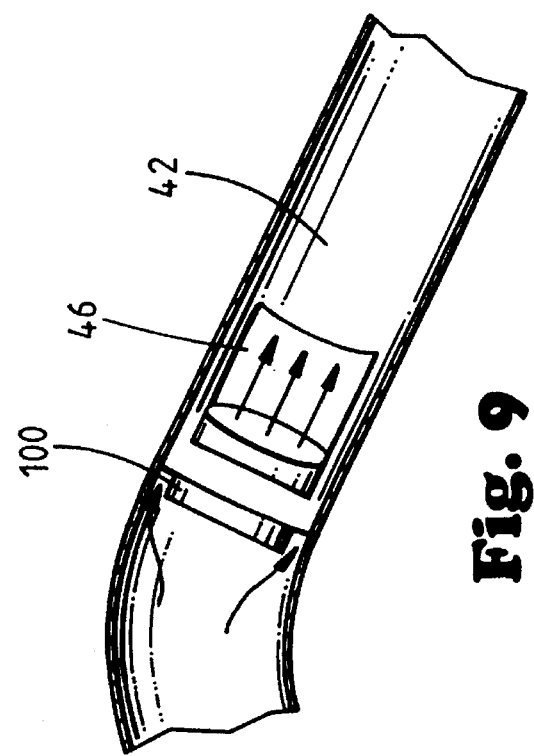
FIG. 9 is a detail view of one portion of the improved system for creating the high velocity air and low pressure cavity area to move the non-ferrous material and any other heavy trash forward through the transport system.

Just inside the opening 46 is an air flow control valve. This feature of the present invention is shown in FIG. 9. The opening 46 has a low pressure area cavity for cans 54 to fall into that is regulated by a flat piece of plastic that acts as an air flow valve 100. This flat piece of plastic slows high velocity air from an air blower 48 (FIG. 2) and channels the air down under the bottom of this flat piece of plastic 100 making the air rush by at a higher rate of speed creating a venturi effect. As the cans 54 fall into the cavity or opening 46, they are blown forward through the high velocity air duct 42.

The motor driven air blower 48 produces a vacuum or a suction at its input side which is coupled by a vacuum conduit 50 to the bottom of a separator housing 52. The separator housing 52 contains a perforated downwardly sloping screen 56. The vacuum is drawn through the screen 56 and creates a suction in a vacuum conduit 64, which terminates above and adjacent to the conveyor 40. The conduit 64 picks up lightweight trash from the conveyor 40 and transports it to housing 52 where it is deposited on top of the screen 56.

The separator housing 52 and associated component parts are shown in greater detail in FIG. 4. The housing 52 has a hooded opening 58 with a hinged, free-swinging door 60 at one side. When blower 48 is running and a vacuum is applied to the interior of the housing 52 through the air duct 50, the suction pulls the door 60 closed against a set of rubber footed stops 62 on the hooded opening 58. The rubber stops 62 act as a pneumatic control since they are adjustable to measure and set the amount of vacuum needed to pull light weight trash from the conveyor 40 and not to suck up the aluminum cans. When the suction is removed (i.e., blower 48 is turned off), the door 60 swings open permitting removal of trash from the screen 56.

As will be described later in greater detail, in conjunction with the section of the conveyor belt 41 adjacent the opening 46 is a magnet means to magnetically grasp deposited steel or other ferrous or magnetically permeable cans strongly enough so that they pass over the end of the conveyor 40 and are knocked off at the underside of the conveyor 40 and deposited on the floor of the collector or in a refuse bin in the lower compartment 34. The magnet means may actually be a part of the belt surface 41 itself but is preferably a plurality of ceramic disks below the surface of the belt 41.

Figure 5:
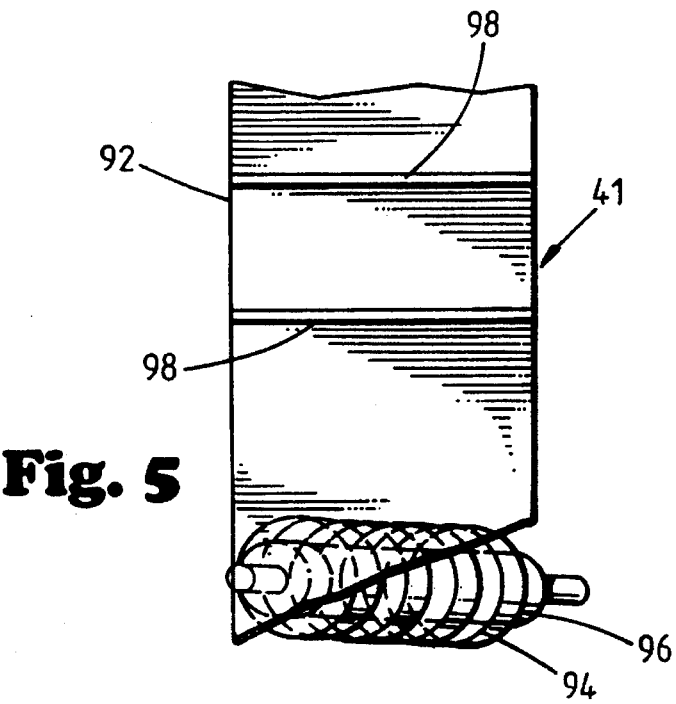
FIG. 5 is more detailed view of an embodiment of a conveyor used in the invention for distinguishing between ferrous and non-ferrous cans.

FIG. 5 illustrates one manner of providing a magnet to the endless belt conveyor surface 41 for holding the magnetically permeable cans and rolling the cans off and under the conveyor and then releasing the cans on to the floor of the lower compartment 34. An endless belt 92 is conventionally made from rubberized material that is laced together to make the belt 92 endless. A series of closely spaced ceramic disk magnets 94 placed on an aluminum shaft 96 with the magnets placed to repel each other is used to magnetically attract ferrous material on the belt 92 and act as a magnetic head pulley/idler for the endless belt. The magnets 94 are "associated with" the endless belt. As used herein, the term "associated with" means that the magnetic element is in close enough proximity and oriented in such a direction as to firmly hold the ferrous materials onto the belt for the prescribed period and distance of travel of the belt. The magnetic element may even be a portion of the belt itself. One advantage of the orientation illustrated in FIG. 5 is that, in arranging the ceramic disk magnets this way, like pole positioning distributes the disks evenly along the aluminum shaft or pulley/idler 96 and also provides a relatively uniform magnetic flux along the length of the shaft.

The belt 92 also includes a plurality of raised ridges 98 which may be formed of a fan-belt material and affixed to the belt 92. These ridges 98 help to move cans and debris along with the movement of the belt toward the region of the system for separation and further processing.

Figure 7:
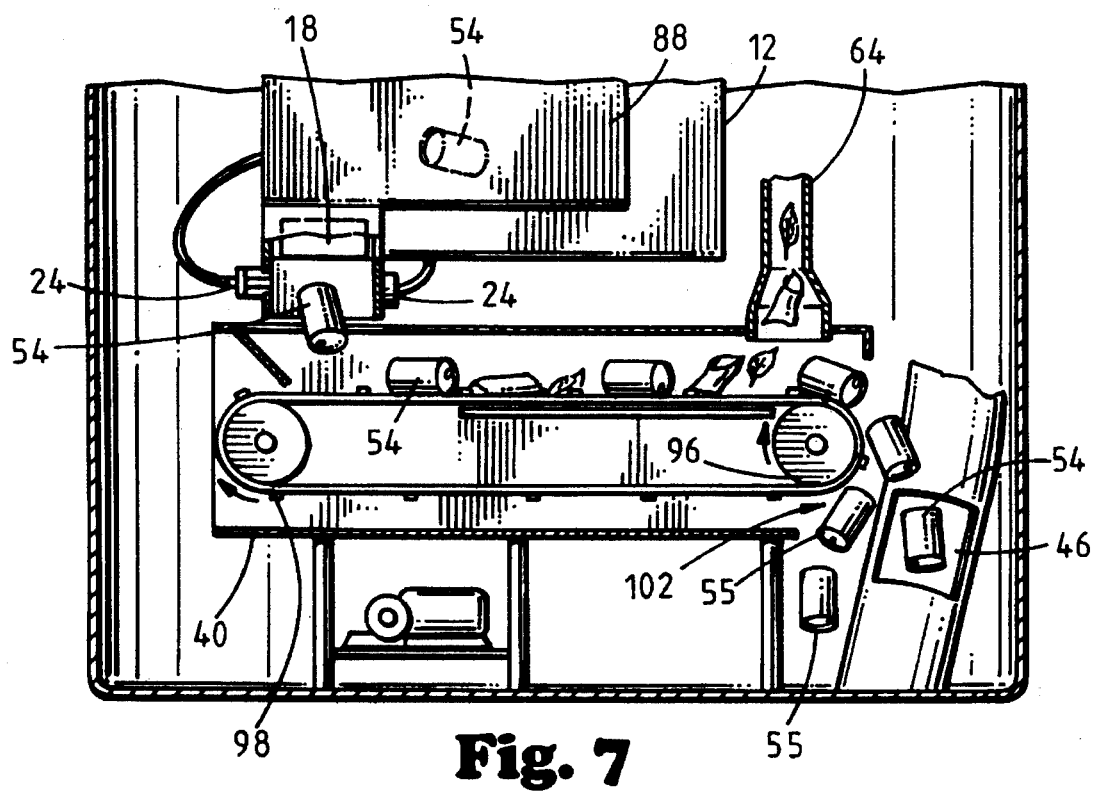
FIG. 7 is a view of the conveyor, illustrating movement and the first and second means of separating desired aluminum cans from trash.

Referring now to FIG. 7, the first two steps in separating aluminum cans from the unwanted articles placed in the collector are shown. Aluminum cans 54 and ferrous cans 55 as well as other debris are deposited into the chute 16. The cans and trash fall by gravity onto the conveyor 40 and are carried to the right as seen in FIG. 7. Near the end of the conveyor, the suction conduit 64 (FIG. 2) draws up the light trash such as paper, leaves, plastic, etc. Aluminum and ferrous cans and other heavier trash (such as glass bottles) are not drawn into the conduit 64. The ferrous cans are then magnetically grasped by magnets associated with the pulley/idler 96 (FIG. 5). The ferrous cans remain in contact with the belt all the way around the pulley/idler 96 until they contact a barrier 102. The barrier 102 dislodges the ferrous cans 55 from the belt and they fall to the floor or into a bin for discarding. Aluminum cans 54 and heavier, non-ferrous debris are directed into the cutout opening 46 by gravity, momentum from the conveyor, and a venturi effect from the air flowing past the opening. Those of skill in the art will recognize that the non-ferrous material may include hi-metal materials that include some fraction of iron in them.

Figure 6:
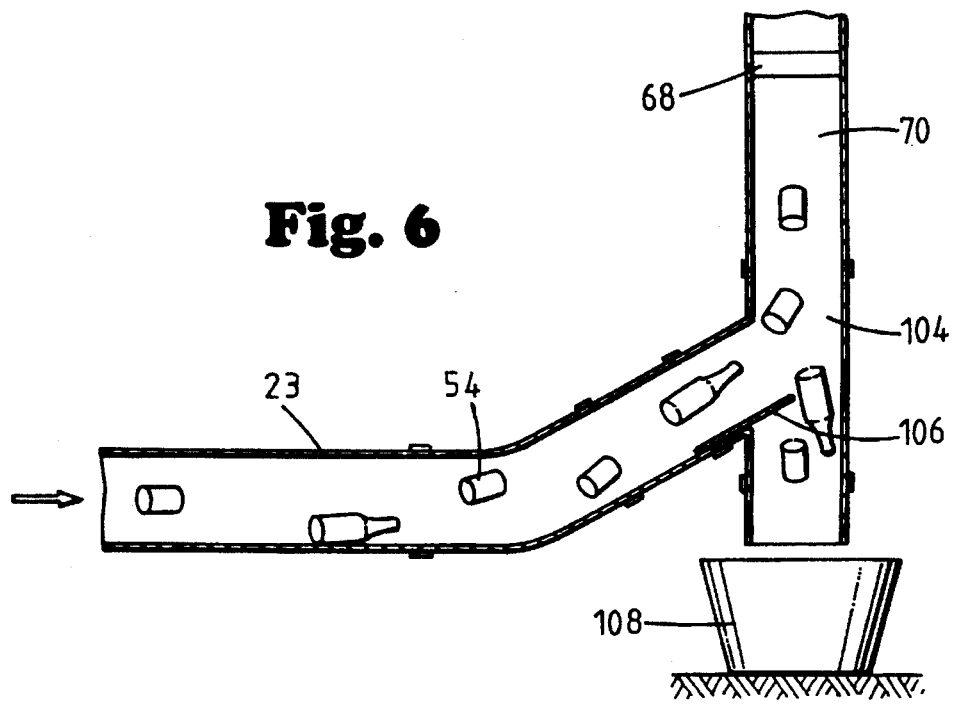
FIG. 6 is a view of the third means of separating trash from a high velocity air conduit.

Returning to FIG. 2, the cans and heavy, non-ferrous debris are directed by high velocity air duct conduit 42 from the opening 46 in front of the conveyor to a wye connection 104. The wye connection 104 couples the conduit 42 to an air conduit riser 70. The wye connection 104 at this juncture acts as a forced air gravity separator. As shown in FIG. 6, this junction includes a baffle plate 106 that extends approximately half way into the conduit riser 70 to create a low pressure area just below the baffle plate. This low pressure area helps to set up a gravity fall area for heavy, non-ferrous debris which has not previously been separated from the aluminum cans. The separated unwanted material falls by gravity into a refuse bin 108 for disposal or further recycling.

An electrical coil 68 (FIGS. 2 and 6) is wrapped around the air duct conduit 70 to produce an electrical signal for each can that passes through the conduit. These electrical signals are fed to suitable electronic circuitry for counting individually the number of aluminum cans which are deposited into the machine. This function is described later with regard to FIG. 10.

Referring now to FIG. 3, the cans 54 are transported by the high velocity air duct 42 into the air duct riser 70 and then upwardly through intermediate floor 28 to a can crusher 72 in the upper chamber 44 of the enclosure 10. The crusher 72 has an inlet chute 74 which directs the cans 54 toward the lower portion of two rotating metal cylinders or rotors 76 which have circumferentially spaced outer elongated teeth 78. These teeth or widely spaced gears help to grasp the cans individually as they arrive from chute 74 so they are crushed between the two rotors 76. Crushed cans 80 are discharged from the crusher 72 onto the floor 28. As illustrated in FIG. 3, preferably crusher 72 is mounted at the interior top of chamber 44 so that the crushed cans fall from the crusher 72 to the floor 28 and the crusher is out of the way of the accumulating crushed cans to facilitate the removal of the stored cans from the storage area.

To recover the crushed cans, the access door 32 is opened and the cans are removed through an opening 84. A salt shaker chute 86 is pulled out at which time the cans will gravity flow out of upper storage area 44 and fall into a storage trailer for transport to a recycling station.

Returning to FIG. 2, a box 88 attached to the interior of the lower chamber 34 of the enclosure 10 opposite the recess 12 has a hinged access door 90 and contains electronic circuitry in the form of a microprocessor programmed to use the counted signals generated by the coil 68 to determine the amount of payment for the deposited cans and to activate a coin dispenser and/or print out a receipt or credit slip along with a summary of the transaction showing the number of cans deposited and other data as desired. The box 88 also contains a modem to permit remote operation of the internal microprocessor off-site. The box 88 may also include electrical circuits and components for checking the operation of the mechanisms and for automatically shutting off the mechanisms if a malfunction occurs or after all the deposited cans have been processed.

Figure 10:
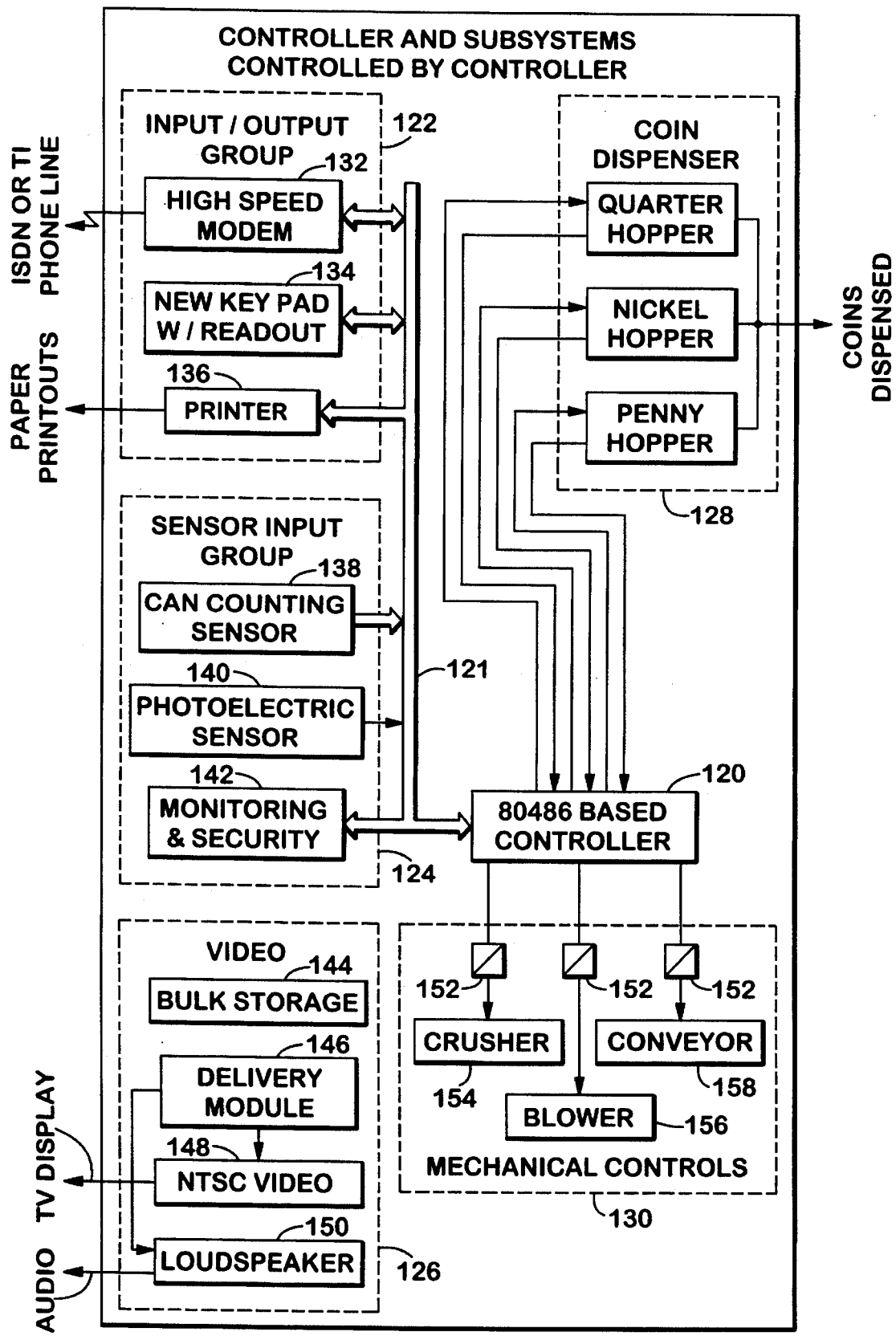
FIG. 10 is a functional block diagram of the computer control and communications aspects of the present invention.

Other details of the circuitry within the box 88 are shown in FIG. 10, which shows the collector controller 120 and the components that it communicates with. These components include an Input/Output Group 122, A Sensor Input Group 124, a Video Group 126, a Coin Dispenser 128, and Mechanical Controls 130. The components are shown communicating with the controller 120 via a bus 121 and this is intended to show a signal path generally since no distinction is made in FIG. 10 between the various logic and voltage levels, and may include RS 232, TTL, or any other standard as appropriate.

The Input/Output Group 122 provides the communications link between the collector and a remote station, such as an owner's or franchisee's place of business. The remote station is coupled to the collector via the Input/Output Group through a high speed modem 132. The high speed modem 132 may be any commercially available modem unit to permit upgrades as technology advances. The modem may be coupled to the remote station by phone line, fiber optic cable, radio link, or any other communications medium desired. A key pad 134, located inside or outside the collector enclosure 10, provides manually input communication at the collector for checking the mechanisms and printing an audit report on site. A printer 136 provides the means of printing out credit slips or coupons, or records of transactions. The printer responds generally to instructions from the controller 120, but may also be directed from the remote station via the modem 132. Each of the modem, the key pad, and printer are coupled to the controller through the bus 121.

The second group, the Sensor Input Group 124, provides monitoring and control functions for the collector, and this group also communicates with the controller 120 over the bus 121. A can counting sensor 138 provides a signal to the controller 120 totaling the number of aluminum cans in a particular transaction to compensate the customer as well as a running total to signal the need to service the collector. A photoelectric sensor 140 activates the collector mechanisms based on signals received from the sensors 24 (FIG. 1). The monitoring security element 142 provides a wide range of user definable functions, such as detection of tampering, and is primarily responsible for monitoring a variety of component parameters, such as temperature, voltage/current, and motion in the various mechanical components inside the collector enclosure 10.

The video group 126 enables video display and audio capability at the collector at the monitor 22 (FIG. 1). These include the bulk storage module 144, the delivery module 146, the NTSC/VGA video component 148, and a loudspeaker 150. The bulk storage module 144 is a type of media storage capable of storing large amounts of data being sent down from the high speed modem 132. This media storage may be hard disk, compact disk, or any other mass storage device. The bulk storage interacts and communicates with the controller 120 and initiates the appropriate signals to produce the pictures projected to the NTSC/VGA video module 148.

The delivery module 146 is where the compression and decompression hardware is located to produce the video and audio projected by the NTSC/VGA video module 148 coupled to the loudspeaker module 150.

The NTSC/VGA video module 148 is a standard TV monitor or computer graphics VGA screen that is used to show the video pictures being produced to show operator instructions on the monitor 22. This module is coupled to the controller 120.

The loudspeaker 150 is a common speaker device used to produce audio sounds associated with the appropriate video being produced or projected through the NTSC/VGA video module 148.

A coin dispenser 128 dispenses coins under the direction of the controller 120 and reports the completion of this task to the controller.

Finally, the mechanical controls comprise a set of relays 152 which couple control signals to motor-controllers 154, 156,158 for the crusher, air blower, and conveyor, respectively. The motor controllers are energized under the direction of the controller but the signals may originate from a variety of sources, but commonly come from the photoelectric sensor 140.

Figure 11:
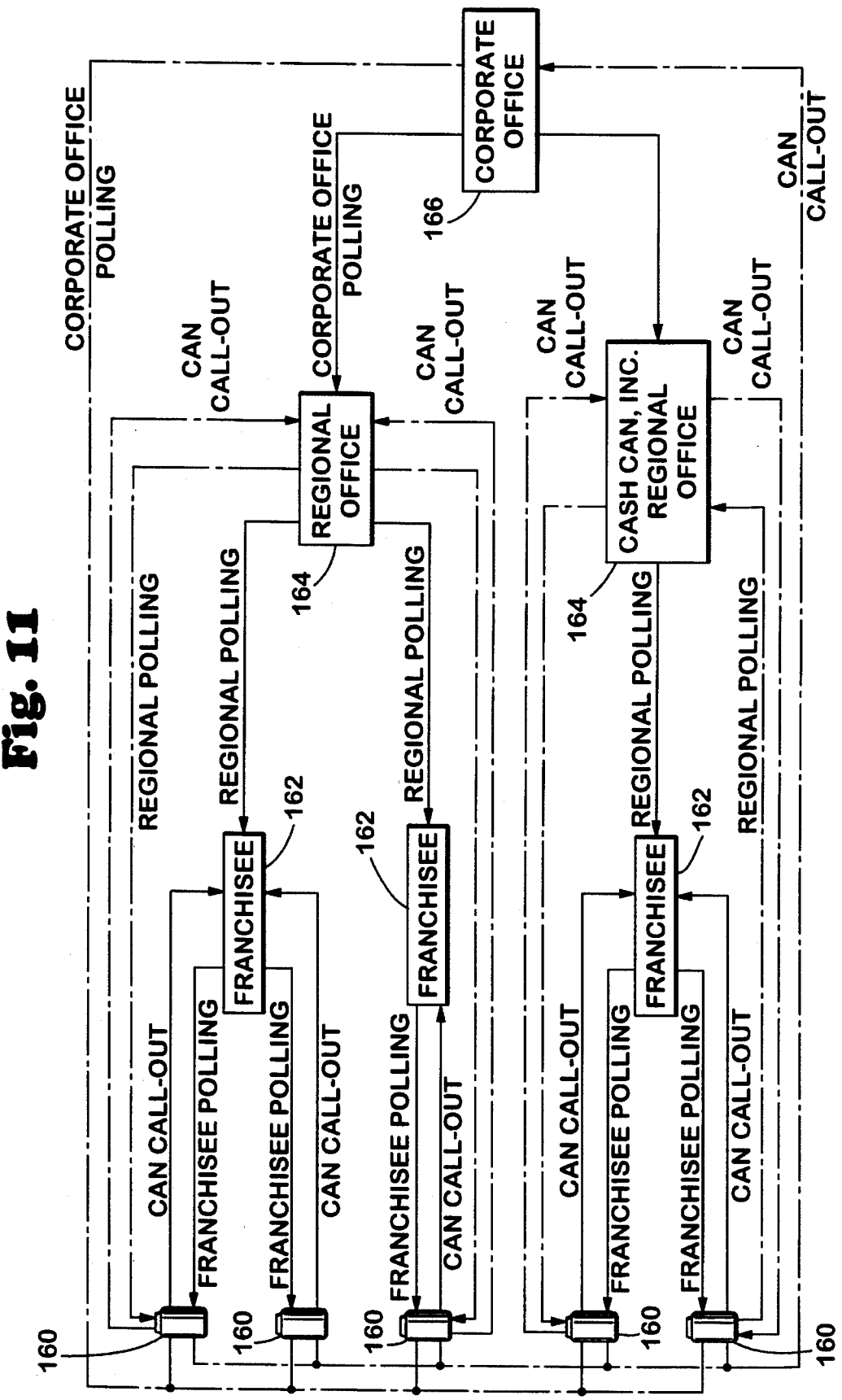
FIG. 11 depicts the communications links for hierarchical reporting and control of a plurality of collectors using the present invention.

FIG. 11 conceptually shows one hierarchical structure for querying and reporting within an entire system of collectors. The hierarchy goes from the bottom level of collectors 160, through a franchisee 162, which may have one or more collectors 160 associated with it, through a regional office 164, to a corporate office 166. Any of the intermediate stages may, of course, be omitted and FIG. 11 illustrates a direct link between the corporate office 166 to the collectors 160. Those of skill in the art will immediately recognize that any network structure may be assembled using the teachings of this disclosure.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without deporting from the spirit of the invention.

I claim:

1. A collector for recyclable metal beverage cans, comprising;
   a. a cylindrical enclosure having an interior area, the cylindrical enclosure including a floor;
   b. an opening into the interior area of the enclosure for inserting beverage cans, including non-ferrous cans and magnetically permeable cans, and trash and lightweight trash;
   c. conveying means in the interior area of the enclosure, the conveying means comprising an endless belt with a first end of the conveying means located below the opening to receive inserted cans, a part of said conveying means associated with a magnet to form a magnetized end of the conveyor for holding only magnetically permeable cans onto the belt and depositing magnetically permeable cans onto the floor of the cylindrical enclosure;
   d. a can crusher in the interior area of the enclosure;
   e. a pneumatic transporter in the interior area of the enclosure for transporting non-ferrous cans from the conveying means to the crusher, the transporter comprising a high velocity air conduit sized to carry non-ferrous cans and trash, the transporter located just beyond the magnetized end of the conveying means;
   f. a vacuum conduit above the conveyor and between the first end and the magnetized end of the conveyor for sucking up lightweight trash from the belt;
   g. means in the interior area of said enclosure for receiving and storing crushed cans from the crusher; and
   h. an air flow control valve in the pneumatic transporter to accelerate the flow of air in the transporter.
2. The collector of claim 1 further comprising can counting means comprising a wire wound coil wrapped around the high velocity air conduit for providing an electrical signal each time a can passes the coil.

3. The collector of claim 1 further comprising a forced air, gravity separator in the high velocity air conduit.

4. The collector of claim 1 wherein the crusher comprises a pair of rotating metal cylinders having circumferentially spaced outer elongated teeth.

5. The collector of claim 1 further comprising an air blower whose suction side is coupled to the vacuum conduit and whose discharge side is coupled to the high velocity air conduit.

6. The collector of claim 1 further comprising a separator housing coupled to the vacuum conduit to receive light trash from the vacuum conduit.

7. The collector of claim 6 further comprising a hinged, free swinging door on the separator and an adjustable stop between the door and the separator for adjusting the vacuum in the separator.

8. The collector of claim 1 wherein the magnet comprises a plurality of disc-shaped magnet elements rotatably carried on a shaft, each of the plurality of magnet elements aligned in polarity opposite to each adjacent magnet element.

9. A collector for use in recycling metal beverage cans, comprising:
   a. a vertically oriented cylindrical enclosure closed at its top and having an interior area;
   b. an opening into the enclosure for inserting metal beverage cans, including non-ferrous cans and magnetically permeable cans, and trash and lightweight trash;
   c. a conveyor in the enclosure for receiving cans and trash inserted through the opening, the conveyor associated with a magnet to form a magnetized end of the conveyor for holding only magnetically permeable cans onto the conveyor;
   d. a vacuum conduit in the enclosure for sucking up trash from the conveyor;
   e. a high velocity air duct with an opening therein to receive cans after they have passed by the vacuum conduit;
   f. a can crusher in the enclosure;
   g. a can counter comprising a wire coil around the high velocity air duct for producing an electrical signal for each can which passes through the counter;
   h. a pressurized air conduit for pneumatically transporting cans from the high velocity air duct to the can crusher; and
   i. an air flow control valve in the pressurized air conduit to accelerate the flow of air in the transporter.

10. The collector of claim 9 further comprising an elevated floor separating the enclosure into upper and lower chambers.

11. The can collector of claim 10 wherein the crusher discharges crushed cans onto the elevated floor.

12. The can collector of claim 9 further comprising a forced air, gravity separator in the high velocity air duct.

13. The collector of claim 9 wherein the crusher comprises a pair of rotating metal cylinders having circumferentially spaced outer elongated teeth.

14. The collector of claim 9 further comprising an air blower whose suction side is coupled to the vacuum conduit and whose discharge side is coupled to the high velocity air duct.

15. The collector of claim 9 further comprising a separator housing coupled to the vacuum conduit to receive light trash from the vacuum conduit.

16. The collector of claim 15 further comprising a hinged, free swinging door on the separator and an adjustable stop between the door and the separator for adjusting the vacuum in the separator.

17. The collector of claim 9 wherein the magnet comprises a plurality of disc-shaped magnet elements rotatably carried on a shaft, each of the plurality of magnet elements aligned in polarity opposite to each adjacent magnet element.

18. A collector for recyclable metal beverage cans, comprising;
   a. a cylindrical enclosure having an interior area, the cylindrical enclosure including a floor;
   b. an opening into the interior area of the enclosure for inserting beverage cans, including non-ferrous cans and magnetically permeable cans, and trash and lightweight trash;
   c. conveying means in the interior area of the enclosure, the conveying means comprising an endless belt with a first end of the conveying means located below the opening to receive inserted cans, a part of said conveying means associated with a magnet to form a magnetized end of the conveyor for holding only magnetically permeable cans onto the belt and depositing magnetically permeable cans onto the floor of the cylindrical enclosure;
   d. a can crusher in the interior area of the enclosure;
   e. a pneumatic transporter in the interior area of the enclosure for transporting non-ferrous cans from the conveying means to the crusher, the transporter comprising a high velocity air conduit sized to carry non-ferrous cans and trash, the transporter located just beyond the magnetized end of the conveying means;
   f. a vacuum conduit above the conveyor and between the first end and the magnetized end of the conveyor for sucking up lightweight trash from the belt;
   g. means in the interior area of said enclosure for receiving and storing crushed cans from the crusher;
   h. a separator housing coupled to the vacuum conduit to receive light trash from the vacuum conduit; and
   i. a hinged, free swinging door on the separator and an adjustable stop between the door and the separator for adjusting the vacuum in the separator.

19. A collector for recyclable metal beverage cans comprising;
   a. a cylindrical enclosure having an interior area, the cylindrical enclosure including a floor;
   b. an opening into the interior area of the enclosure for inserting beverage cans, including non-ferrous cans and magnetically permeable cans, and trash and lightweight trash;
   c. conveying means in the interior area of the enclosure, the conveying means comprising an endless belt with a first end of the conveying means located below the opening to receive inserted cans, a part of said conveying means associated with a magnet to form a magnetized end of the conveyor for holding only magnetically permeable cans onto the belt and depositing magnetically permeable cans onto the floor of the cylindrical enclosure, wherein the magnet comprises a plurality of disc-shaped magnet elements rotatably carried on a shaft, each of the plurality of magnet elements aligned in polarity opposite to each adjacent magnet element;

d. a can crusher in the interior area of the enclosure; a pneumatic transporter in the interior area of the enclosure for transporting non-ferrous cans from the conveying means to the crusher, the transporter comprising a high velocity air conduit sized to carry non-ferrous cans and trash, the transporter located just beyond the magnetized end of the conveying means;

f. a vacuum conduit above the conveyor and between the first end and the magnetized end of the conveyor for sucking up lightweight trash from the belt; and g. means in the interior area of said enclosure for receiving and storing crushed cans from the crusher.

20. A collector for use in recycling metal beverage cans, comprising:

a. a vertically oriented cylindrical enclosure closed at its top and having an interior area;

b. an opening into the enclosure for inserting metal beverage cans, including non-ferrous cans and magnetically permeable cans, and trash and lightweight trash;

c. a conveyor in the enclosure for receiving cans and trash inserted through the opening;

d. a vacuum conduit in the enclosure for sucking up trash from the conveyor;

e. a high velocity air duct with an opening therein to receive cans after they have passed by the vacuum conduit;

f. a can crusher in the enclosure;

g. a can counter comprising a wire coil around the high velocity air duct for producing an electrical signal for each can which passes through the counter;

h. a pressurized air conduit for pneumatically transporting cans from the high velocity air duct to the can crusher;

i. a separator housing coupled to the vacuum conduit to receive light trash from the conduit; and j. a hinged, free swinging door on the separator and an adjustable stop between the door and the separator for adjusting the vacuum in the separator.

21. A collector for use in recycling metal beverage cans, comprising:

a. a vertically oriented cylindrical enclosure closed at its top and having an interior area;

b. an opening into the enclosure for inserting metal beverage cans, including non-ferrous cans and magnetically permeable cans, and trash and lightweight trash;

c. a conveyor in the enclosure for receiving cans and trash inserted through the opening, a part of said conveyor associated with a magnet to form a magnetized end of the conveyor for holding only magnetically permeable cans onto the conveyor, wherein the magnet comprises a plurality of disc-shaped magnet elements rotatably carried on a shaft, each of the plurality of magnet elements aligned in polarity opposite to each adjacent magnet element;

d. a vacuum conduit in the enclosure for sucking up trash from the conveyor;

e. a high velocity air duct with an opening therein to receive cans after they have passed by the vacuum conduit;

f. a can crusher in the enclosure;

g. a can counter comprising a wire coil around the high velocity air duct for producing an electrical signal for each can which passes through the counter; and h. a pressurized air conduit for pneumatically transporting cans from the high velocity air duct to the can crusher.

* * * * *